United States Patent [19]

Graham et al.

[11] 4,283,212

[45] Aug. 11, 1981

[54] TREATMENT OF GAS STREAMS

[75] Inventors: David J. Graham, Diseworth; John W. Armond, Buckhurst Hill, both of England

[73] Assignee: BOC Limited, London, England

[21] Appl. No.: 27,588

[22] Filed: Apr. 6, 1979

[30] Foreign Application Priority Data

Apr. 7, 1978 [GB] United Kingdom ............... 13820/78

[51] Int. Cl.³ ................................................. F25J 3/00
[52] U.S. Cl. ........................................... 62/18; 62/23; 252/411 R; 55/74; 55/80
[58] Field of Search ................... 62/13, 14, 15, 18, 23; 252/411 R; 55/74, 80

[56] References Cited

U.S. PATENT DOCUMENTS

| | | | |
|---|---|---|---|
| 2,882,998 | 4/1959 | Grenier | 62/18 |
| 3,349,570 | 10/1967 | Potts | 62/18 |
| 3,355,859 | 12/1967 | Karwat | 62/18 |
| 3,364,686 | 1/1968 | Becker | 62/18 |
| 3,854,914 | 12/1974 | Leyarovski | 62/18 |

*Primary Examiner*—Norman Yudkoff
*Attorney, Agent, or Firm*—David L. Rae; Larry R. Cassett

[57] ABSTRACT

A portion of a component of a gas stream is condensed with the remaining non-condensed gas stream being passed to an adsorber. The remainder of the component in the non-condensed stream is adsorbed in the adsorber and in a later stage of the adsorber cycle, the adsorbed component is desorbed and supplied to the inlet of a condenser together with the gas stream to promote condensation of the component by providing an increased concentration of the component in the gas stream.

3 Claims, 3 Drawing Figures

TREATMENT OF GAS STREAMS

This invention relates to the treatment of gas streams. In particular it relates to the removal of condensible vapour or gas from a gas or gas mixture containing one or both of water and carbon dioxide. The condensible vapour is typically the vapour of a volatile organic liquid. The organic liquid may, for example, be vinyl chloride or acrylonitrile. It is to be appreciated that the organic liquid could be, as in the example of vinyl chloride monomer, a vapour at atmospheric pressure and ambient temperature (ie. 15° C.).

Two typical practical examples of processes in which are formed waste gas streams contaminated with the vapour or an organic liquid are given below.

In a typical plant for the production of vinyl chloride monomer ethylene is oxychlorinated by reaction with chlorine and oxygen. The oxygen may be provided by air or by commercial oxygen or oxygen-enriched air. The vent gases typically contain ethylene, vinyl chloride monomer, ethylene dichloride, nitrogen and sometimes small portions of oxygen, argon and chlorine.

The volume of gas vented depends on whether air or oxygen is used as the oxidant. The former gives rise to a much greater volume of gas to be vented than does the latter.

The composition of the waste gas depends inter alia on the type of plant, that is whether it uses a fixed bed or fluidised bed reactor.

For a fixed bed plant of average size waste gas may typically be vented at 20,000 cubic meters per hour and may contain about 2% by volume of condensibles (consisting mainly of vinyl chloride monomer), about 1% by volume of argon/oxygen, about 10% by volume or carbon dioxide, the remainder being substantially nitrogen.

In a plant for producing polyvinylchloride (PVC), vinyl chloride monomer is polymerised in suspension in a liquid which is usually water. The reaction is performed under pressure in an atmosphere of nitrogen. At the end of a production run the pressure is "let down" to atmospheric pressure. During this procedure unreacted vinyl chloride monomer is liberated from the system and is vented with nitrogen and water vapour.

In both examples, it is desirable to remove substantially all the vinyl chloride monomer from the vent gas in view of the hazardous nature of the vapour.

Attempts have been made to remove the vinyl chloride monomer and other condensibles by adsorbing them in a carbon bed at a first lower temperature, the vinyl chloride monomer being desorbed at a second higher temperature generated by embedded electrical heaters or direct steam purging. This method suffers from the disadvantage that the carbon beds tend to become clogged with vinyl chloride that polymerises at the desorption temperature.

In Belgian patent specification No. 850,469 there is described a process which attempts to overcome this problem. In this process the gas stream is subjected to an initial treatment to remove carbon dioxide and water vapour, vinyl chloride condensed out of the vinyl chloride stream, and refrigeration recovered from the waste gas stream. There is no attempt to form a relatively concentrated stream of condensible vapour in order to assist the condensation process. The present invention has as an aim the provision of a method of separating condensible vapour from a gas stream carrying such vapour involving the formation of a relatively concentrated stream of the condensible vapour.

In its broadest aspect the invention provides a method of increasing the concentration of a condensible vapour in a gas mixture containing, in addition to the condensible vapour, a carrier gas which method includes the steps of passing the gas mixture through an adsorbent which preferentially adsorbs the condensible vapour but allows at least most of the carrier gas to pass therethrough so as to provide a gas stream having in it a reduced concentration of the condensible vapour, and then desorbing the condensible vapour at a pressure lower than that at which it is adsorbed so as to provide a relatively concentrated stream of the condensible vapour.

Generally, the treatment of the gas mixture by passing it through the adsorbent will be sufficient to remove all or substantially all the condensible vapour from it. The condensible vapour will generally be desorbed along with an amount of carrier gas. Preferably the gas mixture is additionally subjected to a condensation process in which the condensible vapour is condensed by contact or heat exchange with a refrigerant. The condensation step may be performed either before or after the adsorption. If desired the desorbed vapour mixture may be returned to the condenser if the condensation is performed first.

It may also be desirable to give the gas mixture an additional treatment to remove carbon dioxide and/or water vapour therefrom if the gas mixture contains either or both of these constituents. This is preferably done before the condensation and adsorption stages. If the gas mixture is dry, and if the condensible vapour can be condensed at a temperature at which carbon dioxide remains in the gaseous state, no such pre-treatment may be required.

The carrier gas is typically nitrogen or air.

Normally the adsorbent will be provided in a bed. Typically, two or more adsorbent beds will be used. This enables adsorption in one bed to be performed concurrently with desorption from another bed. When the desorption has been completed the two beds can be switched, whichever bed has previously been desorbed being used to adsorb vapour from the gas mixture, and the bed which had been used to adsorb vapour from the gas mixture having that vapour desorbed from it. Arrangements of valves and passages which make possible such switching of beds are well known in the art.

In a preferred method according to the invention the gas mixture is in a condenser heat exchanged or contacted with a refrigerant so as to condense some of the condensible vapour; the uncondensed gas is passed through the adsorbent that preferentially adsorbs the condensible vapour but allows at least most of the carrier gas to pass therethrough; vapour is desorbed from the adsorbent at a pressure lower than the adsorption pressure, and the desorbed vapour returned to the condensor for retreatment.

This preferred method is intended primarily for the treatment of a dry gas mixture. If the incoming gas mixture includes water vapour, such water vapour is preferably removed before the mixture is passed into the condenser. A silica gel or other dryer may be used for this purpose.

The condensation method and apparatus may, if desired, be in accordance with respectively the method and apparatus according to our U.S. Pat. No. 4,188,793.

Preferably, the refrigerant is kept separate from the gas mixture.

The refrigerant is preferably liquid nitrogen or its cold vapour.

If carbon dioxide is present in the gas mixture the condenser is desirably operated at a temperature which the carbon dioxide remains in the gaseous state. Otherwise, it will be necessary to remove carbon dioxide from the gas mixture before passing the gas mixture through the condenser. If the condensible vapour is vinyl chloride monomer or consists largely of vinyl chloride monomer the condenser may typically be operated at a temperature in the range $-30°$ to $-60°$ C., and preferably at a temperature of $-50°$ C. Thus, any carbon dioxide in the gas mixture will remain uncondensed and will pass through the condenser. Some of the carbon dioxide may be adsorbed with the condensible vapour, though this is limited by appropriate choice of adsorbent material. An adsorbent specific to condensible material which does not adsorb $CO_2$ should desirably be chosen. Thus the $CO_2$ will be vented from the system along with uncondensibles.

Regeneration of an adsorption bed which is charged with the adsorbed condensible vapour (and sometimes with carbon dioxide as well) is facilitated by taking a "bleed" of gas from downstream of the adsorption bed in operation at the time as an adsorber and passing the bleed through the adsorbent bed being regenerated.

The adsorption may take place at the same pressure as the condensation. If this pressure is superatmospheric, the incoming gas mixture to be condensed can be compressed to the required pressure. Alternatively, if the adsorption pressure is to be superatmospheric the uncondensed gas can be compressed at a location downstream of the condenser and upstream of the adsorber.

If the condensible vapour is adsorbed at a superatmospheric pressure, desorption can take place at or below atmospheric pressure. If adsorption takes at atmospheric pressure a below-atmospheric pressure is necessary for desportion. A vacuum pump may be used to create a sub-atmospheric pressure. Preferably, a superatmospheric pressure is used for adsorption and sub-atmospheric pressure to effect desorption. Preferably, the difference between the adsorption pressure and the desorption pressure is at least 5 bars. Typically, the adsorption pressure is about 6 bars and the desorption pressure about ¼ bar if the condensible vapour is an organic compound such as vinyl chloride monomer.

In operating the aforementioned preferred method according to the invention, precautions should desirably be taken to ensure that there is a positive flow of gas mixture to be treated. Nitrogen or other suitable "non-reactive" gas is preferably added continuously to the incoming gas mixture upstream of the condenser and any pump or compressor associated therewith. If there is a compressor immediately upstream or downstream of the condenser then it may also be desirable to return a proportion of the gas that has passed through the adsorber to the incoming gas mixture upstream of the condensor. However, should the preferred method according to the invention be intended to cope with an intermittent supply of the gas mixture, it is desirable not to have any compressor associated with the adsorber, either upstream or downstream of the condenser, but instead to adsorb at atmospheric pressure and desorb at sub-atmospheric pressure, preferably 0.1 bar or lower.

The unadsorbed gas is preferably warmed to ambient temperature before being vented to the stack of the plant associated with the production or use of the condensible vapour.

If desired, the low temperature of the uncondensed and unadsorbed gas leaving the adsorber may be used indirectly to assist in adsorbing the condensible vapour. At least four adsorbent beds should be used to achieve this end. One bed may be used to adsorb the condensible vapour from the uncondensed gas this bed having previously been cooled by unadsorbed gas; a second bed is being pre-cooled by the unadsorbed gas; a third bed is desorbing previously adsorbed condensible vapour at a temperature (typically ambient) above the adsorption temperature but below a temperature at which the vapour decomposes or polymerises to form compounds which "clog" the adsorbent and at a pressure lower than the adsorption pressure, this bed having previously been warmed by incoming gas; and a fourth bed is being warmed by, for example, the incoming gas mixture to the desorption temperature. This modification, employing both a "pressure swing" and a "temperature swing" offers the advantage of making possible a more complete regeneration of the adsorbent, greater adsorption capacity and therefore longer cycle times in comparison with a process according to the invention which uses just a "pressure swing". However, it requires more equipment such as valves and control equipment and is more complicated to operate. For example, it may be necessary or advantageous to provide independent sources of heat and cooling in order to facilitate start-up of the plant.

In comparison with the known method of adsorbing condensible vapour in a carbon bed at about ambient temperature and desorbing the vapour at a temperature of more than 50° C., the aforesaid preferred method according to the present invention offers a longer adsorbent life and more reliable operation. (The adsorbent used in the preferred method is preferably a carbon adsorbent). Moreover, the preferred method according to the present invention allows the condenser to be operated at a relatively high temperature which otherwise would not be acceptable if the condensible vapour were vinyl chloride monomer in view of the relatively high concentration of vinyl chloride that remains in the uncondensed gas. Alternatively or additionally, the preferred method according to the invention makes possible use of a smaller condenser than would be possible if merely a condensation process is used to extract the condensible vapour from a gas stream in which it is carried. Thus, reduced consumption of refrigerant is made possible. Furthermore, the vinyl chloride monomer or other volatile or condensible (organic) compound is recovered in liquid state.

In an alternative preferred method according to the invention the gas mixture contains carbon dioxide and/or water vapour, the gas mixture is passed through a first adsorbent which adsorbs carbon dioxide and/or water vapour from the gas mixture in preference to the condensible vapour (or the main constituent thereof) and the carrier gas; the carbon dioxide and/or water vapour is desorbed at a lower pressure or higher temperature than respectively the pressure or temperature at which the adsorption takes place so as to regenerate the first adsorbent; the desorbed carbon dioxide and/or water vapour are vented; the unadsorbed gas is passed through a second adsorbent which preferentially adsorbs the condensible vapour (or its main constituent) and allows at least most of the carrier gas to pass therethrough; the vapour adsorbed by the second adsorbent is desorbed at a pressure lower than that at which it is adsorbed, and the desorbed vapour is then condensed.

Typically, there are at least two beds of the first adsorbent and at least two beds of the second adsorbent, one bed of each adsorbent being regenerated (desorbed) while the other is adsorbing. Typically, the first adsorbent may be a zeolite "molecular sieve" or silica gel and the second adsorbent is carbonaceous (eg. activated charcoal).

At least part and preferably most of the unadsorbed carrier gas is preferably used to help regenerate and purge the first adsorbent and is then vented. A small proportion (typically from 5 to 10%) of the unadsorbed carrier gas is however preferably used to help regenerate the second adsorbent.

The first adsorbent is preferably regenerated at the same pressure at which it is operated during adsorption. The temperature at which the first adsorbent is regenerated is preferably in the range 50° to 110° C. This temperature is preferably provided by passing a warm fluid such as hot water or steam normally available in factories through a heat exchange coil or coils embedded in the first adsorbent. Alternatively, electrical heating elements may be provided for this purpose.

Instead of employing the first adsorbent, a reversing heat exchanger may be used to remove carbon dioxide and/or water vapour from the gas mixture.

The second adsorbent in effect provides a more concentrated stream of the condensible vapour for the condenser thereby allowing a more efficient use of the refrigeration in the condenser to be achieved than if no such adsorption stage were provided. The maximum degree of concentration depends largely on the ratio of the pressure at which the condensible vapour is adsorbed to the pressure at which it is subsequently desorbed. Preferably this ratio is at least 10:1. Preferably, the adsorption takes place at a superatmospheric pressure. A pressure of 10 atmospheres may for example be used. A compressor may be provided to create this pressure. Desorption preferably takes place at less than atmospheric pressure. A vacuum pump may be used to create this pressure.

The condenser may, if desired, be as described and claimed in our copending application U.S. Pat. No. 4,188,793.

However, if the plant from which the waste gas stream emanates (eg. a PVC production plant) has an existing refrigerator for condensing condensible material (eg. vinyl chloride monomer) that condenser may be used. The disadvantage of such condensers is that they generate a temperature no lower than −50° C. and normally about −30° C. and are thus, if used independently of the method according to the invention, are incapable of giving a vent gas with an acceptably low concentration of vinyl chloride monomer.

Should there however be such a refrigerator (typically operating on a closed compressure/expansion cycle using a "Freon" or "Arcton" (registered Trade Marks) as the refrigerant) it may be used in conjunction with a condenser according to our U.S. Pat. No. 4,188,793 is used.

The alternative preferred method according to the invention offers similar advantages to the first mentioned preferred method in which condensation takes place before adsorption.

The method according to the invention is particularly suitable for use in separating one or more of styrene, vinyl chloride monomer, acrylonitrile, tetra-ethyl lead and the like from gas streams. With such compounds, in particular, processes involving mere condensation are likely to be uneconomic. The method according to the invention may also be used in separating one or more or petrol (gasoline), carbon disulphide, a chloroethylene, ethylene oxide, propylene oxide, methyl ethyl ketone, toluene, benzene, xylene, vinyl acetate and hydrochloric acid from gas streams.

The invention will now be described by way of example with reference to the accompanying drawings of which:

Figure 1:
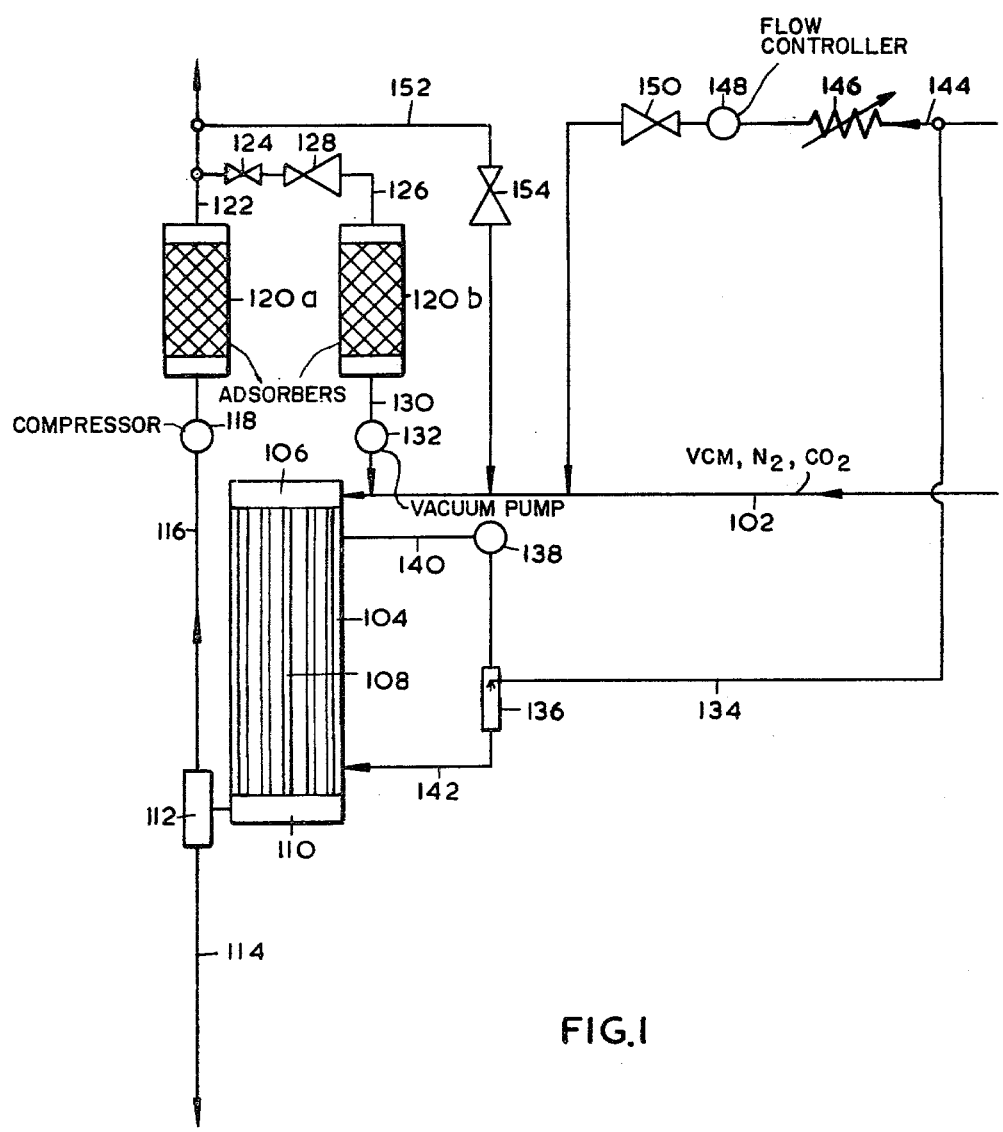
FIG. 1 is a schematic diagram illustrating a first plant for performing the method according to the invention.

Referring to FIG. 1 of the drawings, incoming gas mixture, vented from, for example, a plant for producing vinyl chloride monomer flows along a pipeline 102. The vent gas typically consists mainly of nitrogen, carbon dioxide and vinyl chloride monomer. The gas mixture enters a shell-and-tube heat exchanger tubes 108 so it is cooled by ascending refrigerant outside the tubes. As a result a proportion of the vinyl chloride monomer is condensed. The mixture of gas and condensed vinyl chloride monomer passes out of the heat exchanger 104 via an outlet header 110 and passes into a phase separator 112 which is effective to separate the condensed liquid from the uncondensed gas. The liquid, vinyl chloride monomer, is returned to storage via a line 114. The uncondensed gas, consisting mainly of carbon dioxide, nitrogen and the remainder of the vinyl chloride monomer is drawn along a pipeline 116 by a compressor 118 in which it is compressed to a superatmospheric pressure, of, say, 6 atmospheres. The gas mixture then enters a first column 120(a) containing a bed of activated charcoal adsorbent. As the gas mixture passes through the bed 120(a) so the charcoal preferentially adsorbs substantially all the vinyl chloride monomer from the gas mixture and a proportion of the carbon dioxide. Most of the unadsorbed gas passes out of the adsorber bed 120(a) through a pipeline 122 into a heat exchanger (not shown) in which it is warmed to ambient temperature to enable it to be vented through the stack of the plant (not shown) for producing vinyl chloride monomer.

A second adsorption column 120(b) containing a bed of activated charcoal is provided. A passage 126 having a stop valve 124 located in it places the pipeline 122 in communication with one end of the bed of adsorbent in the column 120(b). The other end of the bed communicates with an outlet conduit 130 which in turn communicates with the inlet to a vacuum pump 132 whose outlet terminates in the pipeline 102. A pressure regulator or pressure reducing valve 128 is provided in the passage 122 and is effective to limit the proportion of the unadsorbed gas that passes through the bed 120(b). The action of the gas passing through the bed 120(b) and of the partial vacuum created by the vacuum pump 132 (typically 0.25 bar) is to cause vinyl chloride monomer and carbon dioxide which had previously been adsorbed in the bed in the column 120(b) to be desorbed and to pass again to the shell-and-tube heat exchanger 104 with the incoming gas mixture and a proportion of the vinyl chloride monomer will be condensed therein.

It is to be appreciated that the adsorption columns 120(a) and 120(b) have associated therewith automatically operating valve means (not shown) effective to "switch" the connections of the columns. Thus the column 120(b) may at one end be placed in communication with the outlet of the compressor 118 and at its other end with one end of the column 120(a) via a pressure reducing valve analogous to the valve 128. When this happens the other end of the column 120(a) is also placed in communication with the inlet of the vacuum pump 132 by the valve means. Thus, as one of the columns 120 adsorbs vinyl chloride monomer and carbon dioxide so the other desorbs the same substances which it had previously adsorbed. The means for effecting such switching are well known in the art.

Of the incoming vinyl chloride monomer, some is condensed in its first pass through the heat exchanger 104. Substantially all the remainder is separated from the gas mixture by adsorption and is then returned to the heat exchanger 104 so that it can be condensed in subsequent passes. Thus, eventually, substantially all the vinyl chloride monomer is condensed from the incoming gas mixture.

The refrigerant for the shell and tube heat exchanger 104 is cold nitrogen gas. Liquid nitrogen from a source (not shown) thereof is passed through a pipeline 134 and is sprayed into a mixing chamber 136 where it is mixed with relatively warm nitrogen gas being pumped from the top of the "shell-side" of the heat exchanger 104 into the chamber 136 by a pump 138 located in a conduit 140 affording a flow path for the nitrogen gas from the heat exchanger 104 to the chamber 136. The liquid nitrogen sprayed into this warm nitrogen is effective to reduce the temperature of the warm nitrogen, the liquid evaporating in the process. The resultant cold nitrogen gas is passed into the bottom of the heat exchanger 104 in which as it ascends it provides the necessary refrigeration to condense some of the vinyl chloride monomer out of the gas mixture.

Typically, the rate of introduction of liquid nitrogen into the chamber 136 is arranged such that the temperature of the condensate is minus 50° C., a temperature at which the carbon dioxide present in the gas mixture will not deposit itself as solid on the heat exchange surfaces it contacts.

The source of liquid nitrogen is also used to provide gas to maintain a positive pressure in the heat exchanger 104 should the supply of incoming vent be shut off for any reason. Thus, a conduit 144 having a vaporiser 146 in it is placed in communication with the source of liquid nitrogen. Downstream of the vaporiser is a flow controller 148 which limits the amount of vaporised nitrogen which can be passed through the conduit 144. Downstream of the flow controller 148 is a demand valve or pressure regulator 150 which allows vaporised nitrogen to pass therethrough should the pressure downstream of it drop below a chosen value. Downstream of the valve 150 the conduit 144 terminates in the pipeline 102, thus enabling the nitrogen to be passed into the gas mixture flowing through the passage 102. Some of the gas vented through the passage 122 may also be used for the same purpose. Accordingly, a passage 152 places the passage 122 in communication with the pipeline 102. In the passage 152 is situated a demand valve or pressure regulator 154 which is arranged to allow unadsorbed gas from the passage 122 into the gas mixture in the pipeline 102 should the pressure downstream of the valve 154 fall below a chosen value.

Figure 2:
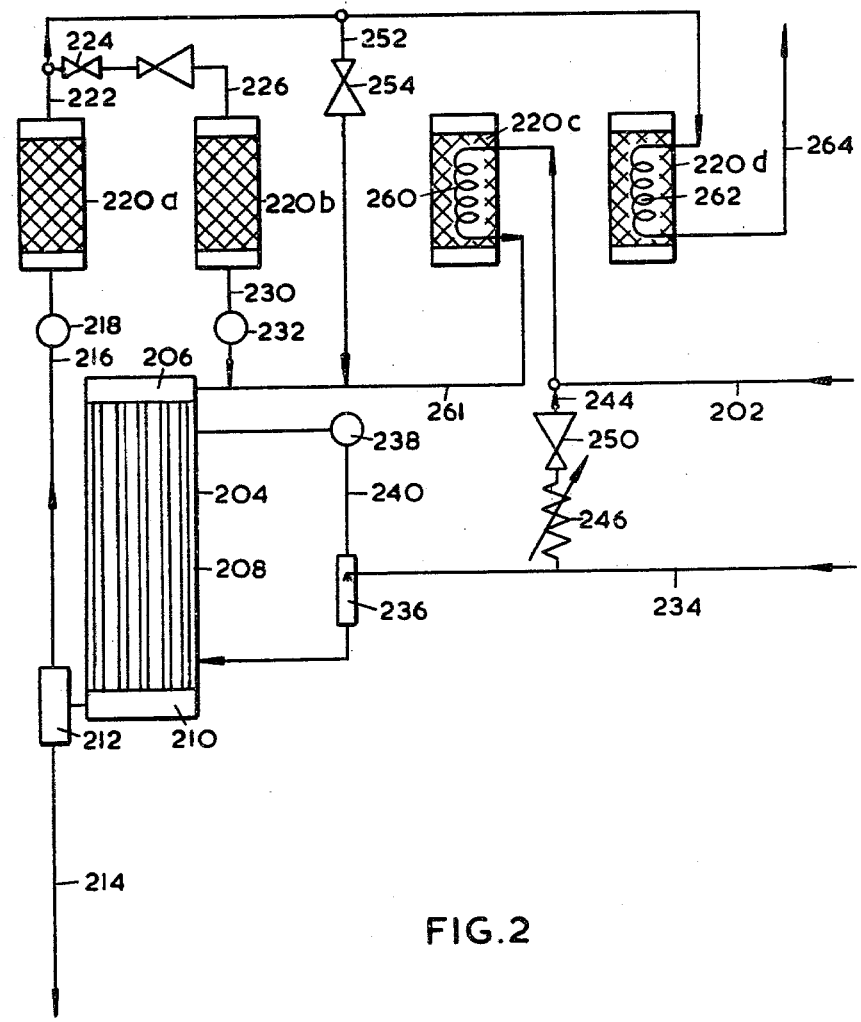
FIG. 2 is a schematic diagram illustrating a second plant for performing the method according to the invention.

Referring now to FIG. 2 of the drawings, a gas mixture vented from, for example, a plant for producing vinyl chloride monomer flows along a pipeline 202. The vent gas typically consists mainly of nitrogen, carbon dioxide and vinyl chloride monomer. The gas mixture passes through a heat exchanger coil 260 located in a bed of activated carbon in an adsorber column 220(c). The gas provides heating for the bed in the column 220(c), (this bed is originally at below ambient temperature as will be explained below). The gas mixture passes from the coil 260 into a pipeline 261 which communicates with a shell-and-tube heat exchanger 204. The gas mixture enters the heat exchanger 204 through an inlet header 206 at the top thereof in communication with vertical heat exchanger tubes 208. The gas mixture passes down the tubes 208 and as it does so it is cooled by ascending refrigerant outside the tubes. As a result a proportion of the vinyl chloride monomer is condensed. The mixture of gas and condensed vinyl chloride monomer passes out of the heat exchanger 204 via an outlet header 210 and passes into a phase separator 212 which is effective to separate the condensed liquid from the uncondensed gas. The liquid, vinyl chloride monomer, is returned to storage via a line 214. The uncondensed gas, consisting mainly of carbon dioxide, nitrogen and the remainder of the vinyl chloride monomer is drawn along a pipeline 216 by a compressor 218 in which it is compressed to a superatmospheric pressure of, say, 6 atmospheres. The gas mixture then enters a column 220(a) containing a bed of activated charcoal adsorbent.

As the gas mixture passes through the adsorbent bed in the column 220(a) so the adsorbent preferentially adsorbs substantially all of the vinyl chloride monomer from the uncondensed gas and a proportion of the carbon dioxide. Most of the unadsorbed gas passes out of the column 220(a) through a pipeline 222 into a heat-exchange coil 262 located in a bed of activated charcoal adsorbent inside a column 220(d). This gas provides cooling for the adsorbent and reduces its temperature to below ambient. After passing through the heat exchanger coil 262 the gas mixture enters a conduit 264 which conducts the gas mixture into a heat exchanger (not shown) in which it is warmed to ambient temperature to enable it to be vented through the stack of the plant (not shown) for producing vinyl chloride monomer.

A small proportion of the unadsorbed gas mixture from the pipeline 222 enters a conduit 226 and passes through a stop valve 224 and thence a pressure reducing valve 228 and enters one end of an adsorption column 220(b) containing a bed of activated charcoal adsorbent. The gas is drawn therethrough by a vacuum pump 232, typically producing a pressure of 0.25 bar, located in a conduit 230 in communication with the other end of the column 220(b). The passage of the gas from the passage 226 through the adsorbent bed in the column 220(b) is effective to desorb therefrom vinyl chloride monomer and carbon dioxide that had previously been adsorbed therein. The temperature at which desorption takes place is approximately ambient, whereas the temperature at which adsorption takes place is approximately that of the uncondensed gas. This temperature difference favours desorption as does the difference between the pressure at which adsorption takes place and the pressure at which desorption takes place.

The desorbed gases pass out of the vacuum pump 232 into the pipeline 261 mixing with the gas mixture passing therethrough and re-entering the heat exchanger 204.

It is to be appreciated that the four desorption columns 220(a) to (d) may be switched so that each one in turn adsorbs vinyl chloride monomer and carbon dioxide from the gas passing out of the compressor 218; is warmed by incoming gas mixture; is "regenerated" by the passage of unadsorbed gas therethrough and by the application of suction by the vacuum pump 232 causing the previously adsorbed fluid to be desorbed; and is pre-cooled (ready for further adsorption) by unadsorbed gas passing out of the column at the time being used to adsorb the vinyl chloride monomer and some of the carbon dioxide from the uncondensed gas. Thus, the following 4-part cycle is continuously performed.

| Part of Cycle | Bed a | Bed b | Bed c | Bed d |
| --- | --- | --- | --- | --- |
| 1st | Adsorbs | Desorbs | Is warmed | Is cooled |
| 2nd | Is warmed | Is cooled | Desorbs | Adsorbs |
| 3rd | Desorbs | Adsorbs | Is cooled | Is warmed |
| 4th | Is cooled | Is warmed | Adsorbs | Desorbs |

Appropriate valve means etc. for switching from one part of the cycle are well known in the art and for purposes of clarity are not shown in FIG. 2 of the drawings. It will be appreciated that in FIG. 2 it is the 1st part of the cycle or sequence which is illustrated.

Of the incoming vinyl chloride monomer, some is condensed in its first pass through the heat exchanger 204. Substantially all the remainder is separated from the gas mixture by adsorption and is then returned to the exchanger 204 so that it can be condensed in subsequent passes. Thus, eventually substantially all the vinyl chloride monomer is condensed from the incoming gas mixture.

The refrigerant for the shell and tube heat exchanger 204 is cold nitrogen gas. Liquid nitrogen from a source (not shown) thereof is passed through a pipeline 234 and is sprayed into a mixing chamber 236 in which it is mixed with relatively warm nitrogen gas being pumped from the top of the space surrounding the heat exchange tubes 208 of the heat exchanger 204 into the chamber 236 by a fan 238 located in a conduit 240 affording a flow path for the nitrogen gas from the heat exchanger 204 to the chamber 236. The liquid nitrogen sprayed into this warm nitrogen is effective to reduce the temperature of the warm nitrogen, the liquid nitrogen evaporating as it cools the gaseous nitrogen. The resultant cold nitrogen gas is passed into the bottom of the space surrounding the heat exchange tubes 208 in the heat exchanger 204, in which, as it ascends, it provides the necessary refrigeration to condense some of the vinyl chloride monomer out of the gas mixture passing through the heat exchange tubes 204.

Typically, the rate of introduction of liquid nitrogen into the chamber 236 is arranged such that the temperatures of the condensate is −50° C., a temperature at which the carbon dioxide present in the gas mixture does not deposit itself as solid on the heat exchange surfaces it comes into contact with.

The source of liquid nitrogen is also used to provide gas to maintain a positive pressure in the heat exchanger 204 should the supply of incoming vent gas be shut off for any reason. A conduit 244 having a vaporiser 246 in it is placed in communication with the source of liquid nitrogen. Downstream of the vaporiser 246 is a demand valve or pressure regulator 250 which allows nitrogen vaporised in the vaporiser 246 to pass therethrough should the pressure downstream of it drop below a chosen value. Downstream of the valve 250 the conduit 244 terminates in the pipeline 202, thus enabling the nitrogen to pass into the pipeline 202 and to be supplied to the inlet header 206 of the heat exchanger 204.

Some of the unadsorbed gas vented through the passage 222 may also be used for the purpose of ensuring that a positive pressure is always maintained in the heat exchanger 204. Accordingly, a passage 252 places the passage 222 in communication with the pipeline 202. In the passage 252 is situated a demand valve or pressure regulator 254 which is arranged to allow the unadsorbed gas from the passage 222 into the gas mixture in the pipeline 202 should the pressure downstream of the valve 254 fall below a chosen value.

Figure 3:
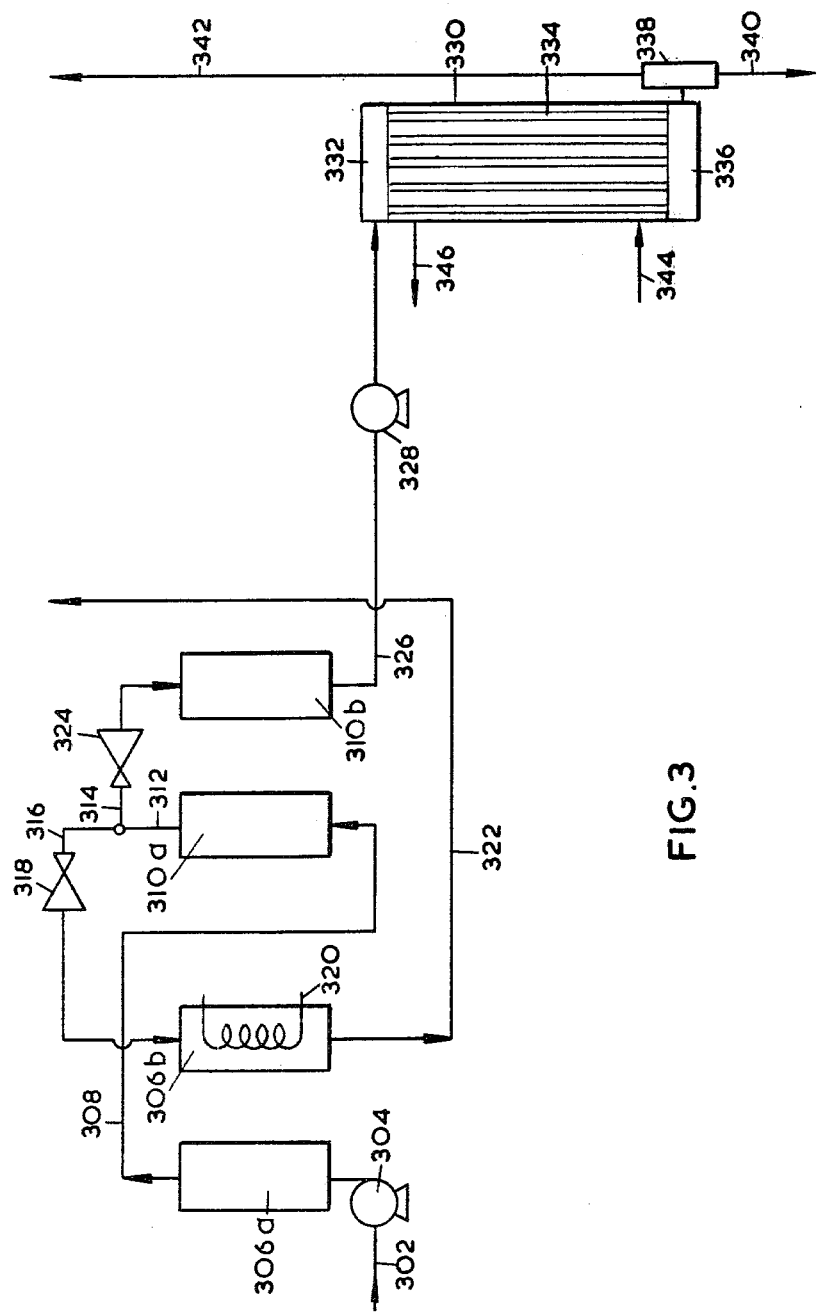
FIG. 3 is a schematic diagram illustrating a third plant for performing the method according to the invention.

Referring now to FIG. 3 of the drawings, incoming gas mixture typically containing vinyl chloride monomer, nitrogen, carbon dioxide, water vapour, and small amounts of oxygen, argon and organic compounds (in addition to vinyl chloride monomer) enters a pipeline 302 and is compressed typically to 10 atmospheres in a compressor 304. From the compressor 304 the compressed gas flows into a column 306(a) containing a bed of zeolite "molecular sieve" adsorbent adapted to adsorb carbon dioxide and water vapour preferentially from the gas mixture. As the gas mixture passes through the column 306(a) so the carbon dioxide and the water vapour are adsorbed. The remainder of the gas mixture passes out of the top of the column 306(a) into a pipeline 308 which terminates in an inlet to the bottom of an adsorption column 310(a) containing a carbon adsorbent adapted to adsorb preferentially vinyl chloride monomer and the other organic compounds from the gas mixture. As the gas mixture passes through the carbon adsorbent so the vinyl chloride monomer and the other organic compounds are substantially all adsorbed.

The remaining gas consisting of nitrogen and typically, small amounts of oxygen and argon flows out of the top of the column 310(a) into the conduit 312 which joins two other conduits 314 and 316. It is arranged that approximately 90% by volume of the gas mixture passing through the conduit 312 passes into the conduit 316. In the conduit 316 is a pressure reducing valve 318 effective to reduce the pressure of the gas passing therethrough to slightly above atmospheric pressure (sufficient to cause flow up a stack). The gas flows through this valve and then into one end of an adsorption column 306(b) identical to the column 306(a). In the column 306(b) a heat exchange coil 320 is embedded in the adsorbent. For the first part of the period during which gas from the conduit 316 is passed through the adsorption column 306(b) hot fluid is passed through the heat exchange coil 320. The effect of the heating and the gas passing through the adsorbent in the column 306(b) causes the carbon dioxide and water vapour to be desorbed and carried out of the column 306(b) entrained in the nitrogen and to be vented from the process via a pipeline 322. The circulation of hot fluid through the heat exchange coil 320 is carried out only for the time necessary for most or all of the carbon dioxide and water vapour to be desorbed from the adsorbent bed in the column 306(b). The heating is then stopped but the passage of nitrogen from the conduit 308 through the column is continued. This helps to return the temperature of the adsorbent in the column 306(b) to a temperature at or near to ambient temperature so that the column 306(b) can be used for adsorption when it is desired to desorb carbon dioxide and water vapour from the adsorbent in the column 306(a). What is done is that valve means (not shown) are operated to effect the necessary switching. Suitable arrangements of valves are interconnecting pipes for doing this are well known in the art.

The 10% or so, by volume of the gas (mainly nitrogen) passing to the conduit 314 from the conduit 312 flows through a pressure reducing valve 324 and is drawn through a bed of carbon adsorbent in an adsorption column 310(b) identical with the column 310(a). A vacuum pump 328 located in a conduit 326 communicating with the end of the column 310(b) opposite to the end thereof in communication with the conduit 314 provides the necessary suction to draw from the conduit 314 through the column 310(b). Typically the vacuum pump creates a pressure of 0.25 bar in the column 310(b).

As the gas (mainly nitrogen) from the conduit 314 passes through the adsorbent in the column 310(b) so it causes vinyl chloride monomer which has previously been adsorbed therein to be desorbed and to be carried out of the column 310(b) entrained in the nitrogen. When most or all of the vinyl chloride monomer has been desorbed the columns 310(a) and 310(b) may be "switched" so that the column 310(b) adsorbs further vinyl chloride monomer and the column 310(a) desorbs the previously adsorbed vinyl chloride monomer. Arrangements of valves and interconnecting pipes for effecting such "switching" of the beds are well known in the art.

The "switching" of the columns 310(a) and 310(b) must be in step with the switching of the columns 306(a) and 306(b). Thus the following two phases cycle is performed repetitively:

|           | Column 306(a) | Column 306(b) | Column 310(a) | Column 310(b) |
|-----------|---------------|---------------|---------------|---------------|
| 1st phase | Adsorbs CO₂ and H₂O | Desorbs CO₂ and H₂O | Adsorbs VCM | Desorbs VCM |
| 2nd phase | Desorbs CO₂ and H₂O | Adsorbs CO₂ and H₂O | Desorbs VCM | Adsorbs VCM |

The vinyl chloride monomer-laden gas passes from the conduit 326 into an inlet header 332 at the top of a shell-and-tube heat exchanger 330. The inlet header 332 communicates with vertical heat exchange tubes 334. As the gas passes down the tubes 334 so it is cooled by a refrigerant passing upwardly through the heat exchanger 330 outside the tubes 334. The cooling is effective to condense substantially all the vinyl chloride monomer contained in the gas mixture. The gas and the condensate pass into an outlet header 336 at the bottom of the heat exchanger 330 and then into a phase separator 338 in which the condensate is disengaged from the uncondensed gas. The condensate, vinyl chloride monomer, is returned to storage via a conduit 340, and the uncondensed gas passes out of the separator into a conduit 342 from which it passes into a heat exchanger (not shown) to be warmed to ambient temperature. The uncondensed gas (substantially nitrogen) may then be vented through the stack of the plant in which the vinyl chloride monomer is produced or used.

The refrigerant for the shell-and-tube heat exchanger 330 is preferably cold nitrogen gas or liquid nitrogen. It is supplied to the bottom of the volume surrounding the heat exchange tubes 334 through an inlet 344 and relatively warm nitrogen gas leaves the top of the volume surrounding the heat exchange tubes 334 through an outlet 346. If desired, the nitrogen can be re-cooled by having liquid nitrogen sprayed into it and can then be recirculated to the inlet 344.

The vinyl chloride monomer may, for example, be condensed at a temperature of −50° C.

We claim:

1. A method of treating a gas mixture comprised of a carrier gas and a minor fraction of vinyl chloride monomer comprising the steps of:
    (a) passing said gas mixture in heat exchange relation with a refrigerant in a condensation device to condense at least a part of the vinyl chloride monomer;
    (b) recovering condensed vinyl chloride monomer from the condensation device;
    (c) supplying the non-condensed portion of said gas mixture from the condensation device to an adsorption unit;
    (d) preferentially adsorbing vinyl chloride monomer from the non-condensed gas mixture in the adsorption unit;
    (e) desorbing the adsorbed vinyl chloride monomer from the adsorption unit;
    (f) passing said desorbed, vinyl chloride monomer to said condensation device thereby increasing the concentration of said vinyl chloride monomer in said condensation device and reducing the refrigeration required to condense a given amount of said vinyl chloride monomer; and
    (g) continuously adding nitrogen gas to the gas mixture upstream of the addition of desorbed vinyl chloride monomer to the gas mixture.

2. The method defined in claim 1 wherein said gas mixture includes a minor fraction of carbon dioxide gas and wherein the step of passing said vinyl chloride monomer in heat exchange relation with a refrigerant comprises maintaining a temperature and pressure in the condensation device at which carbon dioxide remains in its vapour phase.

3. A method of treating a gas mixture comprised of a carrier gas and a minor fraction of a condensible vapour comprising the steps of:
    (a) passing said gas mixture in heat exchange relation with a refrigerant in a condensation device to condense at least part of said condensible vapour;
    (b) recovering condensed vapour from said condensation device;
    (c) supplying the non-condensed portion of said condensible vapour and said carrier gas from said condensation device to the first adsorption bed of an adsorption unit having at least four adsorption beds to preferentially adsorb said condensible vapour in said first bed while discharging said carrier gas therefrom;
    (d) passing a portion of said discharged carrier gas to a second adsorption bed to desorb the condensible vapour previously adsorbed therein and passing said desorbed, condensible vapour to said condensation device to increase the concentration of said condensible vapour therein and reduce the refrigeration required to condense a given amount of said condensible vapour;
    (e) passing a further portion of said discharged carrier gas in heat exchange relation with a third adsorption bed to cool the same prior to supplying the non-condensed portion of the condensible vapor from the condensation device to said third bed; and
(f) passing said gas mixture in heat exchange relation with a fourth adsorption bed containing adsorbed condensible vapour to heat said fourth adsorption bed before said condensible vapour is desorbed therefrom at a greater temperature than the temperature at which said condensible vapour is adsorbed.

* * * * *